No. 789,592. PATENTED MAY 9, 1905.
J. G. DAWSON.
EGG CARRIER.
APPLICATION FILED NOV. 14, 1904.
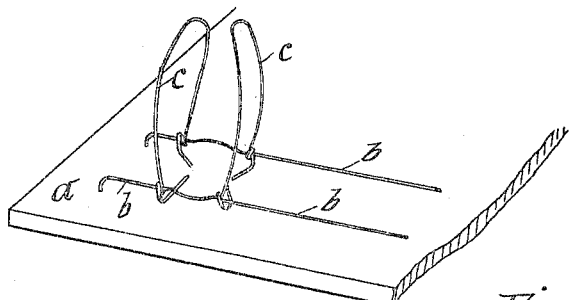
Fig. 1
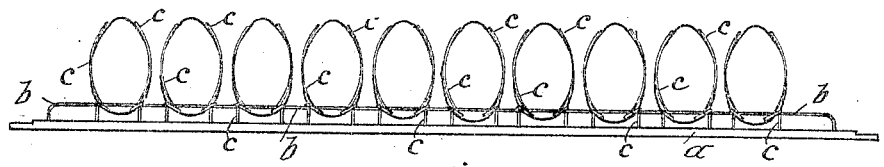
Fig. 3
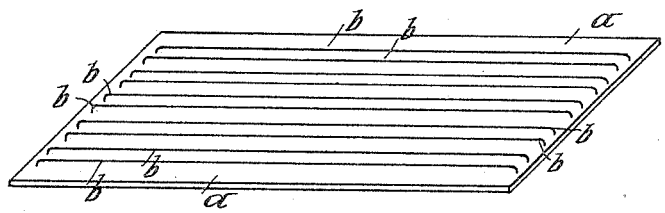
Fig. 2
Witnesses
H. M. Kuhn
John A. Percival
Inventor
James G. Dawson
ATTORNEYS No. 789,592. Patented May 9, 1905.

UNITED STATES PATENT OFFICE.

JAMES GRANT DAWSON, OF WOODBURY, NEW ZEALAND.

EGG-CARRIER.

SPECIFICATION forming part of Letters Patent No. 789,592, dated May 9, 1905.

Application filed November 14, 1904. Serial No. 232,692.

*To all whom it may concern:*

Be it known that I, JAMES GRANT DAWSON, a subject of the King of Great Britain, residing at Woodbury, in the Colony of New Zealand, have invented a new and useful Egg-Carrier; and I do hereby declare the following to be a full, clear, and exact description of the same.

This invention relates to an improved egg-carrier by means of which eggs may be transported with less risk of being broken than is at present the case.

My carrier is so constructed that an egg placed therein is supported without being in contact with a solid body, such as a lath or board. It is therefore less liable to injury; but in order to thoroughly understand the invention reference is made to the accompanying drawings, in which—

Figure 1 is a perspective view of an egg-support, a number of which will when arranged together constitute my egg-carrier. Fig. 2 is a plan of a board, showing longitudinally-placed wires; and Fig. 3 is an elevation of a tray and egg supported according to my invention.

Upon a flat light board $a$, of wood or other suitable material, I arrange wires $b$ $b$ parallel in pairs in such a way that they will stand up about a quarter of an inch from the board-surface. At certain intervals along the wires $b$ $b$ I attach looped wires $c$ $c$, whose ends are turned around the longitudinal wires and secured in the board $a$. The parallel wires are placed a sufficient distance apart to permit an egg when placed between the loops to rest thereon, and that part of the wires $b$ $b$ which is between the points of connection of the looped wires may be slightly bent to form an outward curve to approximately correspond with the curve of the egg. If there are ten of the supports placed in rows five deep, the tray will hold a group of fifty eggs. I generally prefer this number, and I employ the trays in tiers in a case or crate, the number of trays varying with the quantity of eggs to be carried. Owing to the eggs being supported between the loops and their resting on the parallel wires, any jars the crate may receive in transport will not seriously affect them, as the wires will give according as the crate is disturbed.

The looped wires are bent inward, as shown in Fig. 1, which permits of the egg being embraced by the support. It therefore does not matter in what position the trays are placed when stocked with eggs, and they may, if necessary, be placed upside down without risk of the eggs falling out of the supports.

When a number of the trays are to be carried in a crate or case, they may be placed vertically therein. The trays will be slid into grooves formed in the crate sides at intervals a sufficient distance apart to provide clearance between them.

Having now described my invention, what I claim as new, and desire to secure by Letters Patent, is—

In an egg-carrier and in combination a board, pairs of parallel wires extending over the surface thereof, and having their ends secured therein, said ends being bent downwardly so that the wires are slightly above the board, and a plurality of pairs of loops carried by said pairs of wires, the ends of said loops being bent around the parallel wires and secured to the board said parallel wires serving to support the end of the egg.

In testimony whereof I have signed this specification in the presence of two subscribing witnesses.

JAMES GRANT DAWSON.

Witnesses:
P. M. NEWTON,
M. E. EYES.